United States Patent
Francis et al.

(10) Patent No.: US 6,754,035 B2
(45) Date of Patent: Jun. 22, 2004

(54) METHOD AND APPARATUS FOR LIMITING ACTUATOR COIL TEMPERATURE

(75) Inventors: Stuart Kevin Francis, Oklahoma City, OK (US); Mitchell Ray Rose, Edmond, OK (US); Bijan Tehrani, Norman, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 294 days.

(21) Appl. No.: 09/773,974

(22) Filed: Jan. 31, 2001

(65) Prior Publication Data

US 2002/0101682 A1 Aug. 1, 2002

Related U.S. Application Data

(60) Provisional application No. 60/233,891, filed on Sep. 20, 2000.

(51) Int. Cl.$^7$ ................................. G11B 5/596
(52) U.S. Cl. ................ 360/78.06; 360/78.04; 360/75; 360/360.002
(58) Field of Search .............. 360/75, 69, 78.06, 360/78.04, 265; 318/634, 560, 135

(56) References Cited

U.S. PATENT DOCUMENTS

| | | | |
|---|---|---|---|
| 3,860,861 A | | 1/1975 | Gucker |
| 5,119,250 A | * | 6/1992 | Green et al. ............. 360/78.06 |
| 5,268,804 A | * | 12/1993 | Wallis ..................... 360/78.04 |
| 5,594,603 A | * | 1/1997 | Mori et al. .............. 360/78.04 |
| 5,726,835 A | | 3/1998 | Scanlon et al. |
| 5,907,453 A | | 5/1999 | Wood et al. |
| 5,956,203 A | | 9/1999 | Schirle et al. |
| 6,078,455 A | * | 6/2000 | Enarson et al. ............... 360/68 |
| 6,369,972 B1 | * | 4/2002 | Codilian et al. ......... 360/78.04 |

\* cited by examiner

*Primary Examiner*—David Hudspeth
*Assistant Examiner*—K. Wong
(74) *Attorney, Agent, or Firm*—David K. Lucente; Derek J. Berger

(57) ABSTRACT

The temperature of an actuator voice coil in a disc drive is regulated so as to prevent outgassing. In a preferred embodiment, coil temperature is calculated at the beginning of each long seek. If the temperature is determined to be at or below a predetermined "safe" level, temperature rise is not limited and power may be applied to the coil without additional limitations. If, however, coil temperature is determined to be above the "safe" level, proportional control is used to scale back power generation so as to prevent the coil temperature from exceeding the coil's specified temperature limit.

8 Claims, 5 Drawing Sheets

METHOD AND APPARATUS FOR LIMITING ACTUATOR COIL TEMPERATURE

CROSS REFERENCE TO RELATED APPLICATIONS

This application claims the benefit of U.S. Provisional Application No. 60/233,891, filed Sep. 20, 2000.

FIELD OF THE INVENTION

This invention relates generally to the field of hard disc drive data storage devices, and more particularly, but not by way of limitation, to reduction of outgassing from disc drive actuator voice coils.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to "fly" the head assembly in a closely spaced relationship to the disc surface. In order to maintain the proper flying relationship between the head assemblies and the discs, the head assemblies are attached to and supported by flexures attached to the actuator.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member.

On the side of the actuator bearing housing opposite to the coil, the actuator assembly typically includes a plurality of vertically aligned, radially extending actuator head mounting arms, to which the head suspensions mentioned above are mounted. These actuator arms extend between the discs, where they support the head assemblies at their desired positions adjacent the disc surfaces. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved generally radially across the data tracks of the discs along an arcuate path.

Actuator movement is typically controlled by a closed loop digital servo system which serves to accurately position the head over the center of a desired track on a disc surface. This type of servo system obtains head position information from servo fields on the disc. During track-following operations, servo information is read from the disc, and if it is determined that the head is not over the center of the desired track, DC current is sent to the coil in a small amount so as to re-center the head. During track seeking operations, large amounts of current are supplied to the coil so as to provide an initial acceleration to the head, thereby moving it away from a current track toward a desired track. It has typically been an objective in the disc drive industry to decrease seek times in order to increase data access rates. This has been accomplished by making seeks more aggressive; that is, by rapidly accelerating the actuator away from a current track and then rapidly decelerating the actuator as it approaches a desired track. Of course, more aggressive seeks also require more power.

Drive operation can be adversely affected if the drive is subject to contamination. Foreign substances may originate from outside the drive, for example during manufacture if environmental controls are inadequate, or during use if the drive housing is not properly sealed. However, it is also common for these substances to be generated from within the drive during use. Depending upon what materials internal drive components are made of and the temperature to which they are heated, they may release gaseous emissions. This type of contamination is commonly known as "outgassing." Outgassed substances may be deposited on a disc surface, interfering with the ability of a head to read and/or write data from the disc. Disc surface contaminants may also exacerbate static friction, or "stiction", which forms between the head and disc when the drive is not operating and the head is at rest on the disc. In addition to disc contaminants, outgassing may also cause substances to be deposited on other drive components, such as the head, leading to further operational difficulties and eventually drive failure.

One of the primary causes of outgassing is the actuator voice coil. As explained above, during track seeking operations, the head is rapidly accelerated from what is essentially a rest position over an initial track until it reaches a predetermined maximum velocity. It is then rapidly decelerated as it approaches the desired track. In an effort to reduce seek times, seeks have been made more aggressive, requiring more power and increasing the amount of heat generated by the voice coil. If the coil reaches a high temperature for a sustained period, excessive, undesirable outgassing is likely. Such outgassing in turn increases the possibility of drive failure.

A variety of attempts have been made to reduce or eliminate coil-induced outgassing. For example, efforts have been made to select materials for manufacture of drive components which are less prone to outgassing. Recirculating chemical filters have been provided in the drive so as to remove outgassed contaminants from circulation in the drive housing. Others have attempted to coat the coil with materials less likely to outgas when subject to coil temperatures. Still others have attempted to enhance airflow in the coil area in an effort to enhance convection of heat away from the coil. However, none of these methods for reducing outgassing has proved entirely satisfactory for a variety of reasons. Most involve additional costs, for additional parts, more expensive materials or increased manufacturing costs. Moreover, none of these methods address the high power expenditures which is the root cause of the excess coil temperature leading to harmful outgassing.

What the prior art has been lacking is a disc drive in which outgassing is reduced without substantially reducing seek times. It would also be beneficial if such a solution did not involve increased costs associated with additional parts and manufacturing.

SUMMARY OF THE INVENTION

Disclosed is a disc drive in which the temperature of an actuator voice coil is regulated so as to prevent outgassing. In a preferred embodiment, coil temperature is calculated at the beginning of each long seek. If the temperature is determined to be at or below a predetermined "safe" level, temperature rise is not limited and power may be applied to the coil without additional limitations. If, however, coil temperature is determined to be above the "safe" level, proportional control is used to scale back power generation so as to prevent the coil temperature from exceeding the coil's specified temperature limit.

Further features and benefits of the present invention will become apparent to one of ordinary skill upon a careful review of the following drawings and accompanying detailed description.

DETAILED DESCRIPTION OF THE INVENTION

Figure 1:
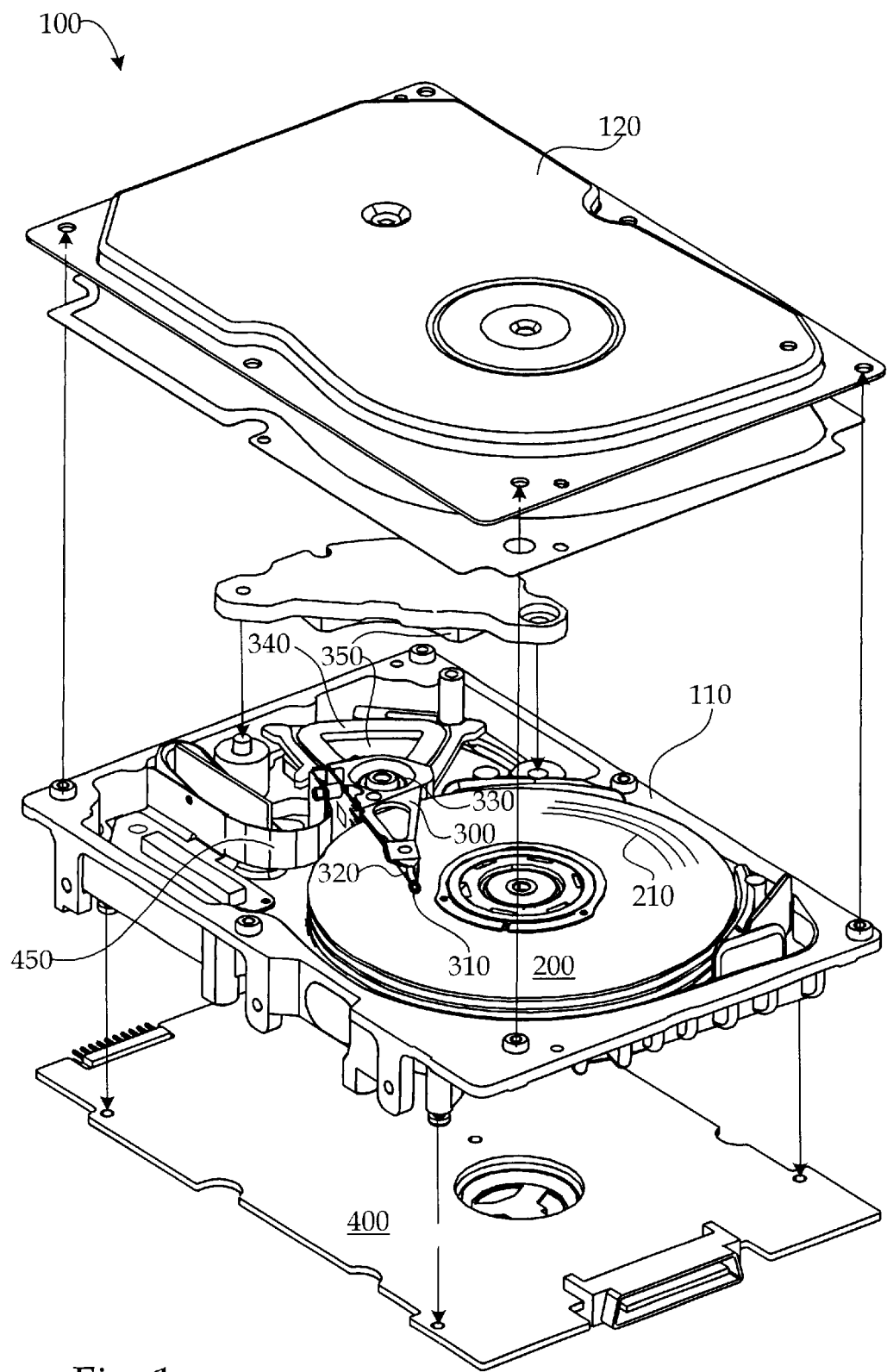
FIG. 1 shows an exploded view of a disc drive incorporating the coil temperature monitoring and limiting circuitry of the present invention.

Turning now to the drawings and specifically to FIG. 1, shown is an exploded view of an example of a disc drive 100 in which the present invention is particularly useful. The disc drive 100 includes a deck 110 to which all other components are directly or indirectly mounted and a top cover 120 which, together with the deck 110, forms a disc drive housing which encloses delicate internal components and isolates these components from external contaminants.

The disc drive 100 includes a plurality of discs 200 which are mounted for rotation on a spindle motor (not shown). The discs 200 include on their surfaces a plurality of circular, concentric data tracks 210 on which data are recorded via an array of vertically aligned head assemblies (one of which is shown at 310). The head assemblies 310 are supported by flexures 320, which are attached to arm portions of actuator 300. The actuator 300 is mounted for rotation about a pivot shaft 330.

Power to drive the actuator 300 about the pivot shaft 330 is provided by a voice coil motor (VCM). The VCM consists of a coil 340 which is supported by the actuator 300 within the magnetic field of a permanent magnet assembly having spaced upper and lower magnets 350. Electronic circuitry to control all aspects of the operation of the disc drive 100 is provided on printed circuit board (PCB) 400. Control signals to drive the VCM are carried between the electronic circuitry and the moving actuator 300 via a flexible printed circuit cable (PCC) 450, as are data signals sent between the heads 310 and the electronic circuitry.

Movement of a head 310 over disc 200 is effected by applying electrical current to the coil 340, which is positioned between permanent magnets 350. The magnetic field set up by energized coil 340 interacts with the magnetic field of magnets 350, causing the coil to move relative to the magnets. This in turn causes the actuator 300 to pivot about bearing 330, moving a head 310 toward a desired track 210. Over time, as the actuator 300 is repeatedly driven during seeks, moving the heads back and forth over the discs, applied current can cause the coil 340 to heat up to very high temperatures. At these high temperatures, the coil 340 may outgas, causing emissions which can lead to data loss, component damage or even drive failure. The coil 340 is especially vulnerable to outgassing following a series of seeks which are of sufficient length to allow the actuator to reach maximum velocity, while being short enough to require deceleration soon after reaching maximum velocity. This is because it does not include enough "cruise" time to allow the coil to cool before decelerating. It is therefore desirable to prevent the coil 340 from heating to a temperature at which, if sustained, excess outgassing will occur. The outgas temperature of a given coil is dictated by a variety of factors, including but not limited to the precise composition of the wiring forming the coil 340, the dimensions of the wiring and the configuration of coil 340. The likelihood of outgassing of any materials near to or in contact with the coil 340, such as insulation or epoxies, should also be considered. The outgas temperature may be determined by reference to a manufacturer's coil specifications or through experimentation.

Coil temperature rise may be limited in a number of ways. First, a limit may be placed on maximum seek velocity. Drive circuitry typically include a an upper limit on actuator velocity during seeks. Temperature rise may be limited by reducing this maximum seek velocity. In this situation, full power is applied to the coil 340 to produce maximum acceleration of the actuator 300. However, because maximum actuator velocity will be reached in a shorter time, maximum coil voltage will be cut off sooner, thereby limiting the rise in coil temperature. Moreover, the amount of time during which the actuator is "cruising" toward its destination is increased, allowing the coil more time to cool before being energized again for deceleration.

Second, dwell times may be added after long seeks. Here, after a long seek in which rapid acceleration and deceleration have caused excess coil temperature rise, a slight delay is implemented before the next seek is initiated. This allows the coil an opportunity to cool before beginning another seek.

Third, a limit may be placed on actuator acceleration. This is accomplished by limiting the power which may applied to the coil, so the coil heats more slowly and to a lesser extent.

In a preferred embodiment of the invention, the coil temperature is monitored and limited only when it is likely the coil will begin outgassing. As explained above, outgassing is most likely following a series of seeks which reach maximum velocity but have very little "cruise" time between acceleration and deceleration. At the beginning of such a seek, the temperature of the coil 340 is measured. If it is determined that coil temperature is above a "safe" level, (i.e., a temperature high enough that a series of seeks could result in a sustained period at an outgassing temperature) measures such as those described above must be taken to prevent an excess rise in temperature over the course of the seek. If, however, the coil temperature is determined to be at or below the coil's predetermined "safe" temperature, the risk of excess outgassing is sufficiently low so that no attempt will be made to limit the rise in coil temperature.

In another aspect of the invention, temperature determinations are made using the drive circuitry itself, in a manner which will now be explained. First, it should be understood that the resistance of a conductor is directly proportional to its temperature. That is, as coil temperature rises, the resistance of the coil 340 rises proportionally. It follows that if we know the proportional relationship between the temperature and resistance of the coil 340, and we have measured the resistance of the coil 340 at a given point in time, we can calculate the coil temperature.

The resistance of the coil 340 at any given moment may be calculated using Ohm's Law, which states that the current (i) in an electric circuit is inversely proportional to the resistance (R) of the circuit and directly proportional to the voltage (V) in the circuit, alternately stated as V=i·R. We are applying a known, constant maximum voltage to the coil at the beginning of a seek. It follows that if we measure the current at this point, we can then calculate the coil's resistance. This measurement is preferably made near the beginning of the seek, but after inductive effects from the initial voltage surge have dissipated. Of course, the coil also begins generating back electromagnetic forces (BEMF) shortly after the seek begins, and the current measurement is preferably made when both inductive effects and BEMF are minimized so as to minimize distortions in current measurement.

As stated above, coil resistance is proportional to temperature. In another aspect of the invention, the resistance at a known temperature is determined through a calibration process conducted prior to use of the drive 100 for data storage. Individual drive calibration provides an accurate determination of the proportional relationship between a coil's temperature and resistance, enabling us to determine temperature once we have calculated the coil's resistance. Calibration is preferably performed under conditions where coil temperature can be measured or controlled, and where coil resistance can also be measured or calculated.

Figure 2:
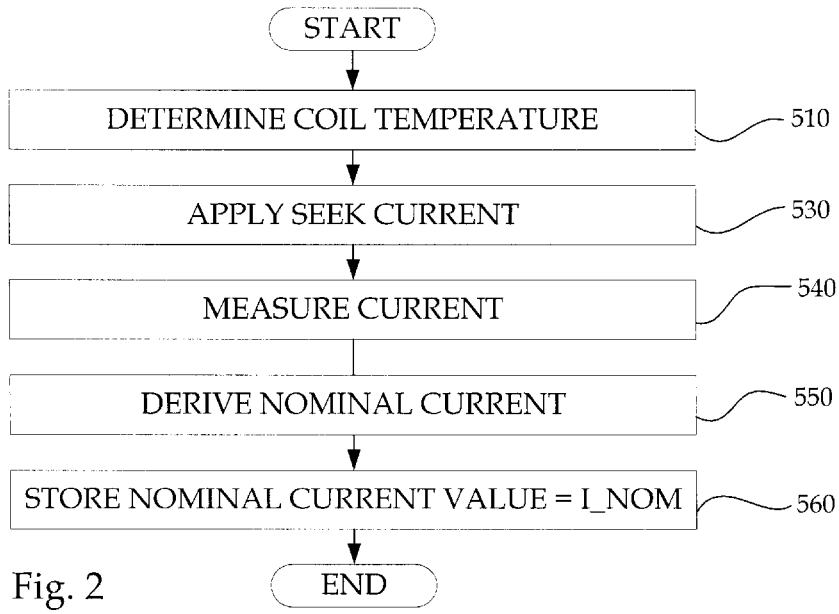
FIG. 2 shows a flow diagram depicting a drive calibration sequence.
Figure 3:
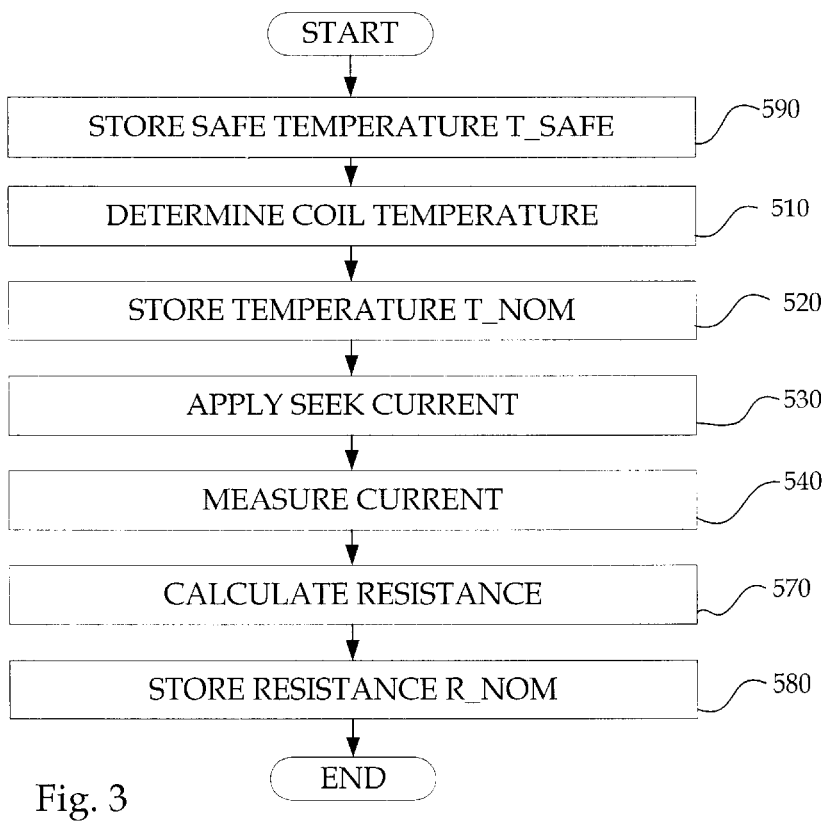
FIG. 3 shows a flow diagram depicting another drive calibration sequence.

An application of these principles in a preferred embodiment of an outgassing prevention method in a disc drive as implemented in a disc drive. First, as illustrated in FIGS. 2 and 3, calibration is performed, preferably in the factory prior to shipping for consumer use, though it may of course be performed at any time prior to monitoring and limiting of temperature during use. For calibration purposes, the coil 340 may be at any temperature which may be determined 510 as a result of being either measured or controlled. Calibration is preferably performed by applying 530 seek current to the coil 340 and then measuring 540 the current when both inductive effects and BEMF are minimized. In one embodiment shown in FIG. 2, the proportional relationship between the coil's current and temperature is then determined, and a nominal current is derived therefrom 550 which is representative of the current which would be present at the coil's "safe" temperature. This nominal 20 current is then stored 560 in the drive's non-volatile memory, referred to here for convenience as value I_NOM. In another embodiment, illustrated in FIG. 3, coil 340 resistance is actually calculated 570 using the applied voltage value and the measured current value. In this embodiment, rather than storing a nominal current value, nominal temperature is stored 520 as value T_NOM and the result of the resistance calculation is stored 580 as value R_NOM. The predetermined safe temperature T_SAFE is also stored 590 in the drive's non-volatile memory in the embodiment of FIG. 3.

Figure 4:
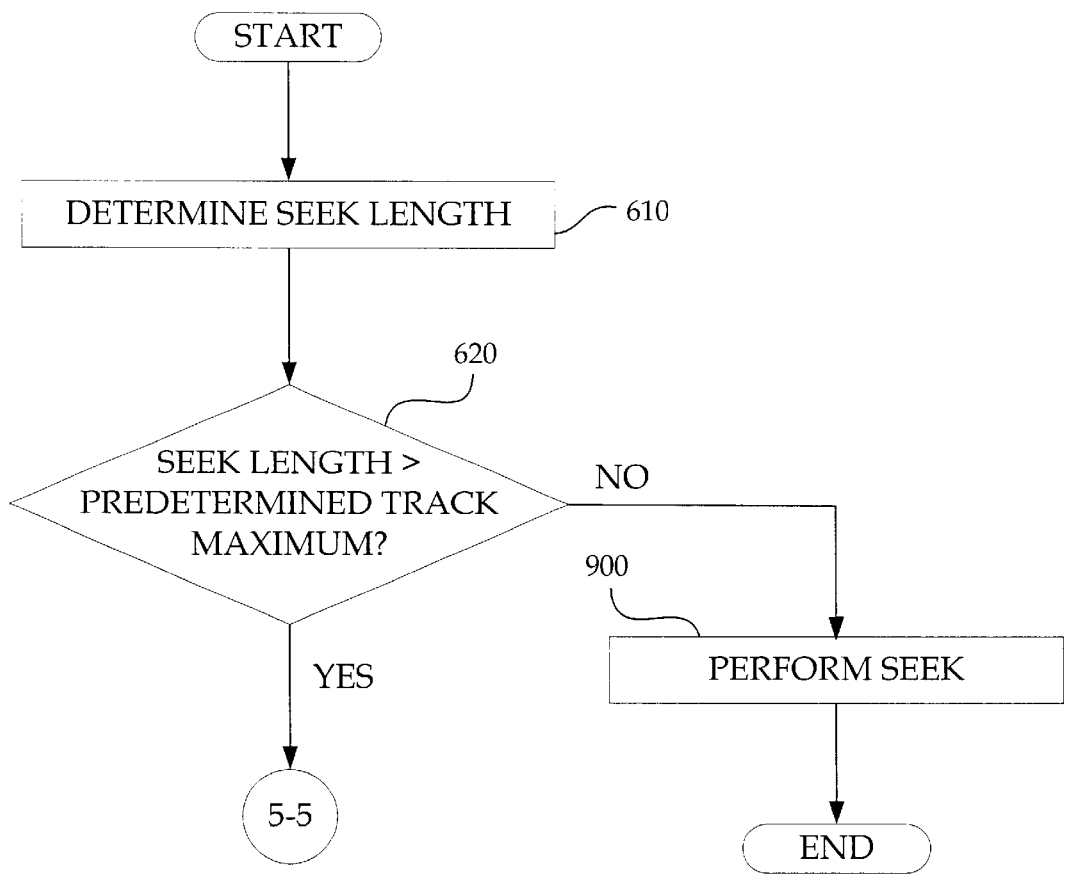
FIG. 4 shows a flow diagram depicting a temperature monitoring determination?.

The calibrated drive 100 is then shipped for consumer use. Once in operation, as illustrated in FIG. 4, a determination is made prior to each seek as to whether coil 340 temperature will be monitored. The determination is made based on whether the seek length is within a range of a number of tracks predetermined to be more likely to cause undue coil temperature rise. This predetermined track number range has preferably been selected to include seeks reaching maximum velocity with little or no cruise time, although the range may simply be defined as any length exceeding a predetermined minimum. Before each seek, its length is determined 610. A determination is then made 620 as to whether the seek length falls within the predetermined track number range. If the seek length does not fall within the range, there is no need to monitor coil temperature and the seek is performed 900. If the seek length is within the range, the coil temperature must be checked 5—5 in order to decide whether to limit temperature rise during seek performance 900.

Figure 5:
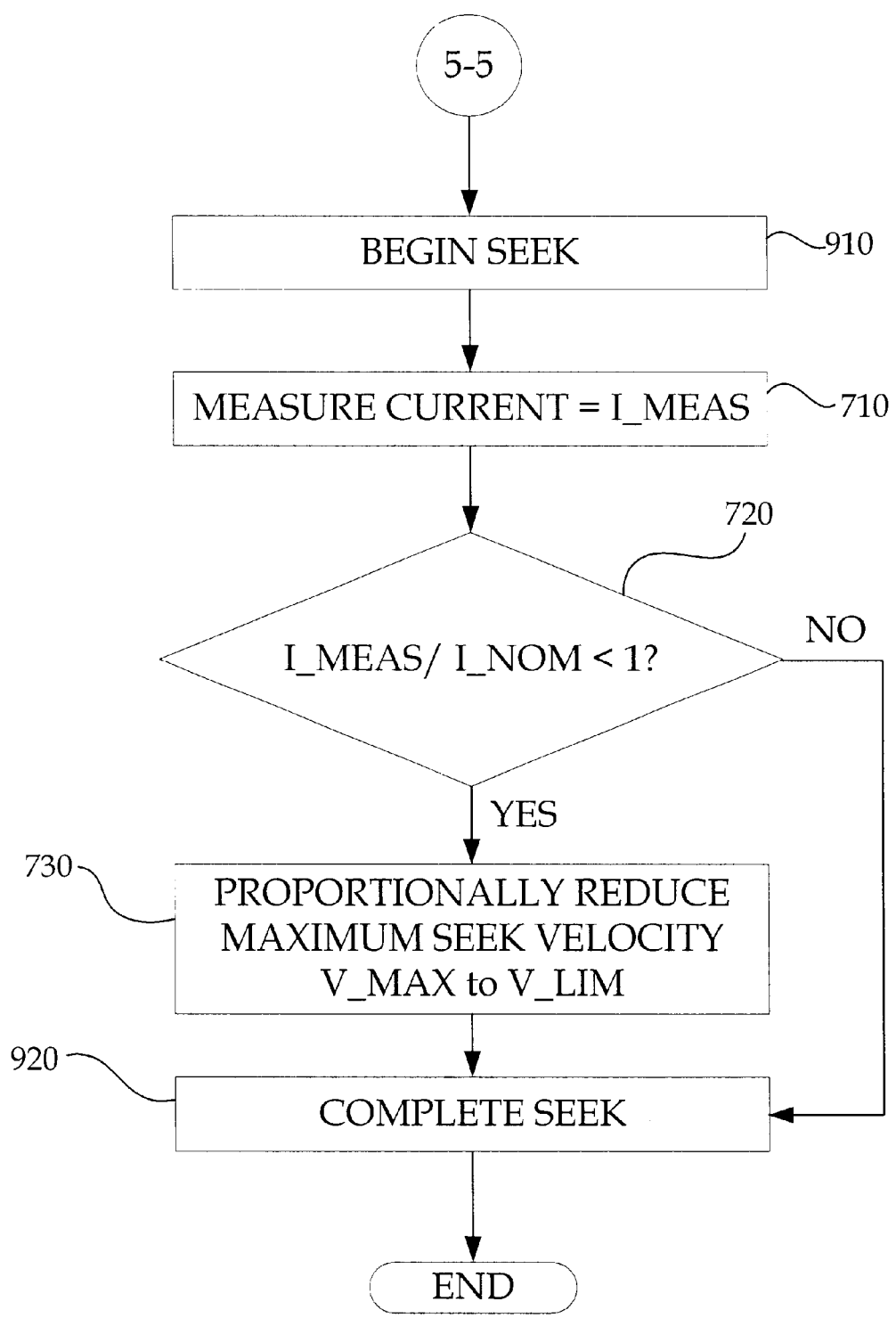
FIG. 5 shows a flow diagram depicting a temperature monitoring and limiting sequence.
Figure 6:
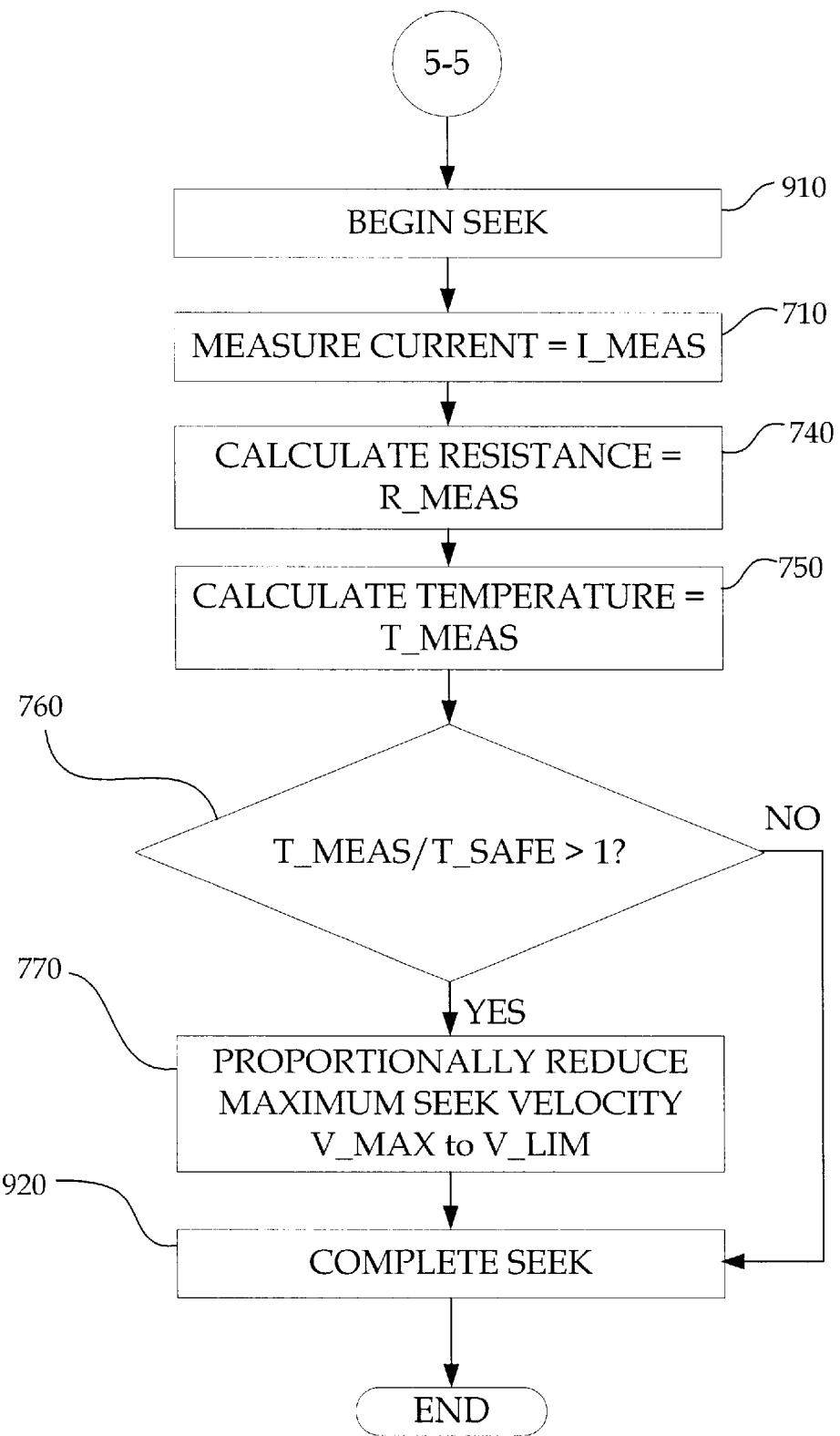
FIG. 6 shows a flow diagram depicting another temperature monitoring and limiting sequence.

FIGS. 5 and 6 show procedures which monitor and limit coil temperature based on the calibrations performed in FIGS. 2 and 3, respectively, assuming a determination has been made as in FIG. 4 that monitoring is necessary. Shortly after the seek has begun 910, when inductive effects and BEMF are minimal so as to reduce distortions in measurement, current is measured 710. In the embodiment of FIG. 5, the measured current, denoted here for convenience as I_MEAS, is then compared 720 to I_NOM. Comparison is performed 720 by dividing I_MEAS by I_NOM. If the result is not less than 1, there is presently little risk of excess outgassing and the seek is completed 920 without limiting temperature rise. If the result is less than 1, it is clear that coil temperature is in excess of the "safe" temperature and there is a significant risk of outgassing, and it is therefore necessary to limit the power supplied to the coil 340 in order to limit its temperature rise. One way to accomplish this is to multiply the nominal maximum seek velocity (designated V_MAX here for convenience) by the ratio of I_MEAS/I_NOM to arrive 730 at a proportionally limited maximum seek velocity V_LIM so as to reduce the time period over which current is applied to the coil during acceleration. One of ordinary skill will recognize that other factors may be involved in proportionally limiting V_MAX to derive V_LIM; for example V_MAX may be multiplied by a constant and by I_MEAS/I_NOM, or a constant may be added. What is important is that V_LIM is derived in some way from the ratio I_MEAS/I_NOM such that maximum velocity is limited only as necessary depending upon the extent to which the coil 340 temperature exceeds the safe temperature. Once maximum seek velocity has been limited 730, the seek is completed 920.

In the embodiment of FIG. 6, the measured current, denoted here for convenience as I_MEAS, is measured 710 and then used along with the applied voltage to calculate 740 the coil resistance R_MEAS. The coil temperature T_MEAS can then be derived 750 with respect to R_MEAS, by using the following equation, as is generally known:

$$T\_MEAS = ((R\_NOM - R\_MEAS)/I\_NOM) * (1/Zeta) + T\_NOM$$

where Zeta is a property of the material. (Zeta is typically 0.0039 to 0.0042 for copper wire, depending on the copper purity.) T_MEAS can then be directly compared 760 to the safe temperature T_SAFE. Comparison is performed 760 by dividing T_MEAS by T_SAFE. If the result is not greater than 1, there is presently little risk of excess outgassing and the seek is completed 920 without limiting temperature rise. If the result is greater than 1, it is clear that coil temperature is in excess of the "safe" temperature and there is a significant risk of outgassing, and it is therefore necessary to limit the power supplied to the coil 340 in order to limit its temperature rise. One way to accomplish this is to divide the nominal maximum seek velocity (designated V_MAX here for convenience) by the ratio of T_MEAS/T_SAFE to arrive 730 at a proportionally limited maximum seek velocity V_LIM so as to reduce the time period over which current is applied to the coil during acceleration. One of ordinary skill will recognize that other factors may be involved in proportionally limiting V_MAX to derive V_LIM; for example V_MAX may be multiplied by a constant and divided by T_MEAS/T_SAFE, or a constant may be added. What is important is that V_LIM is derived in some way from the ratio I_MEAS/I_NOM such that maximum velocity is limited only as necessary depending upon the extent to which the coil 340 temperature exceeds the safe temperature. Once maximum seek velocity has been limited 730, the seek is completed 920.

Where temperature rise is to be limited by reducing seek acceleration rather maximum seek velocity, maximum seek voltage may instead be proportionally limited using the ratios I_MEAS/I_NOM or T_MEAS/T_SAFE. It is also contemplated that where dwell times following seeks are to be used to allow coil 340 cooling, dwell time lengths could be determined using these ratios.

Monitoring and limiting coil temperature as described above provides many advantages over prior methods for preventing coil outgassing. All calculations and measurements are performed by firmware which is already a part of most disc drives, so no additional parts or manufacturing steps are required in assembling the drive. Because temperature is monitored only during long seeks when the safe temperature is exceeded, so overall seek times are only minimally increased. Moreover, temperature rise is proportionally limited, so seek times are increased only to the extent necessary to prevent outgassing. Because temperature rise is limited when the coil exceeds the safe temperature, coil temperature never reaches its outgas temperature and coil outgassing is substantially reduced.

Alternately characterized, a first contemplated embodiment of the invention includes a method for monitoring and limiting a disc drive actuator coil 340 temperature during a seek by an actuator 300. This is done by initiating the seek 910 and then generating an indication 720 during the seek of whether the coil temperature is below a safe temperature. If the indication is positive, a first seek rate is selected, but otherwise a second seek rate slower than the first seek rate is generally selected 730 so as to avoid reaching a critical temperature higher than the safe temperature. The seek is then completed 920. Optionally, the actuator 300 may have a predetermined maximum seek velocity, and the first seek rate is selected by reducing the actuator's maximum seek velocity 730, 770. As a further option, the negative indication will be made after measuring the current 710 applied to the coil and comparing 720 the measured current to a stored current value representative of the safe temperature.

Alternately characterized, a second contemplated embodiment of the invention includes a method for preventing outgassing of a disc drive actuator coil 340. The coil 340 is connected to a power source and has a temperature above a predetermined safe temperature. In applying this method, the extent to which the coil temperature exceeds the predetermined safe temperature is determined 720, 760. Then power supplied to the coil by the power source is limited 730, 770 to a degree which is dependent upon this determination. Optionally, the coil 340 is carried by a disc drive actuator 300 having a predetermined maximum seek velocity, and power is limited by reducing the maximum seek velocity of the actuator 730, 770, and the reduction in maximum seek velocity is proportional to the extent to which the coil temperature exceeds the predetermined safe temperature. As a further option, the method further includes determining a length of a seek to be performed 610, and the temperature is monitored 710, 750 and the power limited 730, 770 only if the length of the seek to be performed exceeds a predetermined safe seek length 620. As yet another option, the coil temperature may derived from a current measured 710 in the coil.

From the foregoing, it is apparent that the present invention is particularly suited to provide the benefits described above. While particular embodiments of the invention have been described herein, modifications to the embodiments which fall within the envisioned scope of the invention may suggest themselves to one of skill in the art who reads this disclosure.

We claim:

1. A method for monitoring and limiting a disc drive actuator coil temperature during a seek by an actuator, to method comprising steps of:
   (a) initiating the seek;
   (b) during the seek, generating an indication of whether the coil temperature has remained below a safe temperature, the indication being generated independent of a radial distance traveled by the actuator over a disc during a fixed period of time in response to an application of a control current to an actuator coil; and
   (c) selecting a first seek rate if the indication is positive and otherwise generally selecting a second seek rate slower than the first seek rate so as to minimize reaching a critical temperature higher than the safe temperature.

2. The method of claim 1 in which the actuator has a predetermined maximum seek velocity, and in which selecting the first seek rate in step (c) comprises a step of:
   (c1) reducing the maximum seek velocity.

3. The method of claim 1 and further including steps of:
   (e) measuring current applied to the coil during the seek; and
   (f) comparing the measured current to a stored current value representative of the safe temperature, such that in step (c) a negative indication is generated if the measured current is less than the stored current.

4. An apparatus comprising:
   at least one storage medium;
   an actuator configured to move a transducer relative to the at least one storage medium;
   a coil carried by the actuator; and
   electronic circuitry configured to:
   (b) during a seek, generate an indication of whether a coil temperature has remained below a safe temperature, the indication being generated independent of a radial distance traveled by the actuator over a disc during a fixed period or time in response to an application of a control current to an actuator coil; and
   (c) selecting a first seek rate if the indication is positive, else generally selecting a second seek rate slower than the first seek rate.

5. A method comprising steps of:
(a) determining the extent to which a coil temperature exceeds a predetermined safe temperature; and
(b) limiting power supplied to a coil by a power source, the degree of limitation being dependent upon the determination made in step (a).

6. The method of claim 5, in which the coil is carried by a disc drive actuator having a predetermined maximum seek velocity, the power limiting step (b) further comprising a step of:
(b1) reducing the maximum seek velocity of the actuator, the reduction in maximum seek velocity being proportional to the extent to which the coil temperature exceeds the predetermined safe temperature.

7. The method of claim 5 in which the coil is carried by an actuator configured to perform a seek, further comprising a step of:
(c) determining a length of a seek to be performed, steps (a) and (b) being performed only if the length of the seek to be performed is determined to exceed a predetermined safe seek length.

8. The method of claim 5 in which step (a) includes steps of:
(a1) measuring current in the coil; and
(a2) deriving a temperature measurement from the current measurement.

* * * * *